(12) United States Patent
Qiu

(10) Patent No.: US 8,058,375 B2
(45) Date of Patent: Nov. 15, 2011

(54) USE OF ETHYLENE-TETRAFLUOROETHYLENE CARBOXYLIC ACIDS AND SALTS AS SURFACTANTS FOR AQUEOUS EMULSION POLYMERIZATION OF FLUORINATED MONOMER

(75) Inventor: Weiming Qiu, Wilmington, DE (US)

(73) Assignee: E I. du Pont de Nemours and Company, Wilmington, DE (US)

( * ) Notice: Subject to any disclaimer, the term of this patent is extended or adjusted under 35 U.S.C. 154(b) by 274 days.

(21) Appl. No.: 12/582,938

(22) Filed: Oct. 21, 2009

(65) Prior Publication Data
US 2010/0160550 A1    Jun. 24, 2010

Related U.S. Application Data

(60) Provisional application No. 61/140,200, filed on Dec. 23, 2008.

(51) Int. Cl.
| | |
|---|---|
| C08K 5/101 | (2006.01) |
| C08F 14/18 | (2006.01) |
| C08F 14/26 | (2006.01) |
| C08F 214/18 | (2006.01) |
| C08F 214/26 | (2006.01) |

(52) U.S. Cl. .......................... 526/214; 526/242; 526/255
(58) Field of Classification Search .................. 526/214, 526/242, 255
See application file for complete search history.

(56) References Cited

U.S. PATENT DOCUMENTS

| | | | |
|---|---|---|---|
| 6,395,848 B1 * | 5/2002 | Morgan et al. ................. | 526/214 |
| 2006/0178472 A1 * | 8/2006 | Johnson ........................ | 524/805 |

OTHER PUBLICATIONS

Beletskaya et al., The Heck Reaction as a Sharpening Stone of Palladium Catalysis, Chem. Rev., vol. 100 (2000), pp. 3009-3066.
Chen et al., A General Method to Fluorous Ponytail-Substituted Aromatics, Tetrahedron Letters, vol. 42 (2001), pp. 4275-4278.
Kobayashi et al., Convenient Synthesis of 3,3,3-Trifluoropropenyl Compounds From Aromatic Aldehydes by Means of the TBAF-Mediated Horner Reaction, J. Org. Chem, vol. 67 (2002), pp. 3156-3159.
Neubert et al., The Effect of Fluorinated Terminal Chains on the Mesomorphic Properties of 4,4'-Disubstituted Phenyl Benzoates, Liquid Crystals, vol. 32, No. 6 (2005), pp. 781-795.

* cited by examiner

*Primary Examiner* — Kelechi Egwim

(57) ABSTRACT

Provided are polyfluorinated carboxylic acids and their salts containing an ethylene-tetrafluoroethylene moiety. The polyfluorinated carboxylic acids and salts are useful as surfactants in polymerization processes.

13 Claims, No Drawings

USE OF ETHYLENE-TETRAFLUOROETHYLENE CARBOXYLIC ACIDS AND SALTS AS SURFACTANTS FOR AQUEOUS EMULSION POLYMERIZATION OF FLUORINATED MONOMER

FIELD OF THE INVENTION

This invention relates to the field of polyfluorinated compounds and particularly to carboxylic acids and their salts containing an ethylene-tetrafluoroethylene moiety, and to their use as surfactants in a process for the dispersion polymerization of fluorinated monomer in an aqueous polymerization medium.

BACKGROUND

A typical process for the aqueous dispersion polymerization of fluorinated monomer includes feeding fluorinated monomer to a heated reactor containing a fluorosurfactant and deionized water. Paraffin wax is employed in the reactor as a stabilizer for some polymerizations, e.g., polytetrafluoroethylene (PTFE) homopolymers. A free-radical initiator solution is employed and, as the polymerization proceeds, additional fluorinated monomer is added to maintain the pressure. A chain transfer agent is employed in the polymerization of some polymers, e.g., melt-processible TFE copolymers to control melt viscosity. After several hours, the feeds are stopped, the reactor is vented and purged with nitrogen, and the raw dispersion in the vessel is transferred to a cooling vessel. For use in fluoropolymer coatings for metals, glass and fabric, polymer dispersion is typically transferred to a dispersion concentration operation which produces stabilized dispersions used as coatings. Certain grades of PTFE dispersion are made for the production of fine powder. For this use, the dispersion is coagulated, the aqueous medium is removed and the PTFE is dried to produce fine powder. Dispersions of melt-processible fluoropolymers for molding resin use are also coagulated and the coagulated polymer dried and then processed into a convenient form such as flake, chip or pellet for use in subsequent melt-processing operations. Successful production of the high solids fluoropolymer dispersion generally requires the presence of a surfactant in order to stabilize the dispersion preventing coagulation of the fluoropolymer particles.

Fluorosurfactants used in the polymerization are usually anionic, non-telogenic, soluble in water and stable to reaction conditions. The most widely used fluorosurfactants are perfluoroalkane carboxylic acids and salts as disclosed in U.S. Pat. No. 2,559,752 to Berry, specifically perfluorooctanoic acid and salts, often referred to as C8, and perfluorononanoic acid and salts, often referred to as C9. Because of recent environmental concerns with regard to perfluorooctanoic acid and salts, there is interest in reducing or eliminating perfluorooctanoic acid and its salts in fluoropolymer polymerization processes.

It is also desirable to provide new and improved fluorinated surfactants in which the perfluoroalkyl group of the prior art is replaced by partially fluorinated terminal groups that require less fluorine and show increased fluorine efficiency. By "fluorine efficiency" is meant the ability to use a minimum amount of fluorine to obtain a desired surface effect or surfactant properties, or to obtain better performance using the same level of fluorine. A surfactant having high fluorine efficiency generates the same or greater level of surface effect using a lower amount of costly fluorine than a comparative surfactant.

SUMMARY OF THE INVENTION

Provided is a process comprising the step of polymerizing at least one fluorinated monomer in an aqueous medium containing initiator and fluorosurfactant, said fluorosurfactant comprising a compound of Formula (I)

$$R_f(CH_2CH_2CF_2CF_2)_x(CH_2CH_2CF_2)_yC(O)OM \quad (I)$$

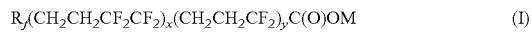

wherein $R_f$ is a linear or branched perfluoroalkyl group with 1 to 4 carbon atoms, x is 1 to 3, and y is 0 or 1; and M is H, $NH_4$, Li, Na, or K; with the proviso that the sum of x and y is 2 or greater.

DETAILED DESCRIPTION

Described herein are partially-fluorinated compounds containing one or more ethylene-tetrafluoroethylene moieties ($—CH_2CH_2CF_2CF_2—$) which can be used in aqueous emulsion polymerization of fluorinated monomers or as intermediates for the preparation of other fluorinated compounds. The compounds of this invention have the general formula $$R_f(CH_2CH_2CF_2CF_2)_x(CH_2CH_2CF_2)_yC(O)OM \quad (I)$$

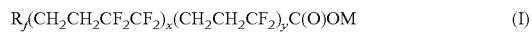

wherein $R_f$ is a linear or branched perfluoroalkyl group with 1 to 4 carbon atoms, x is 1 to 3, y is 0 or 1, and M is H, $NH_4$, Li, Na, K, or linear, branched or cyclic alkyl containing 1-8 carbon atoms; with the proviso that the sum of x and y is 2 or greater.

Typically, $R_f$ can be a linear perfluoroalkyl group, more typically $CF_3CF_2—$. Typically x can be 1 to 2; when x is 1 y is typically 1 and when x is 2 y is typically 0. M is typically $NH_4$, methyl or ethyl.

The compounds of Formula (I) can be prepared by any means known in the art. When y=1, they can be prepared via the following reaction scheme:

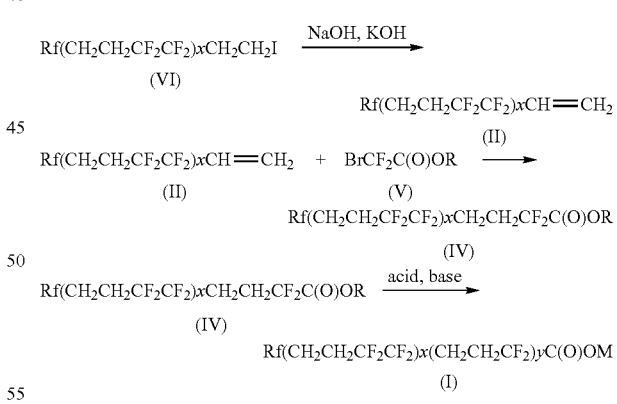

The olefin containing compound of Formula (II) can be prepared by reacting partially fluorinated alkyl iodide having the formula $$R_f(CH_2CH_2CF_2CF_2)_xCH_2CH_2I \quad (VI)$$

with NaOH or KOH.

Compounds of formula (VI) can be prepared by oligomerization of $R_fI$, wherein $R_f$ is as defined for formula (I), and a mixture of ethylene (ET) and tetrafluoroethylene (TFE). The reaction can be conducted at any temperature from room temperature to about 150° C. with a suitable radical initiator.

Preferably the reaction is conducted at a temperature of from about 40° to about 100° C. with an initiator which has about a 10 hour half-life in that range. The feed ratio of the starting materials in the gas phase, that is the moles of $R_fI$ in relation the combined moles of ethylene and tetrafluoroethylene, can be used to control conversion of the reaction. This mole ratio is from about 1:3 to about 20:1, preferably from about 1:2 to 10:1, more preferably from about 1:2 to about 5:1 The mole ratio of ethylene to tetrafluoroethylene is from about 1:10 to about 10:1, preferably from about 3:7 to about 7:3, and more preferably from about 4:6 to about 6:4.

Next, the compounds of Formula (IV)

$$R_f(CH_2CH_2CF_2CF_2)_xCH_2CH_2CF_2C(O)OR \quad (IV)$$

can be prepared by reacting the partially-fluorinated fluoroalkyl olefin of Formula (II) with a bromodifluoroacetate of Formula (V)

$$BrCF_2C(O)OR \quad (V)$$

wherein R is linear, branched or cyclic alkyl containing 1-8 carbon atoms. Compounds of Formula (V) are available commercially. This reaction can be carried out at elevated temperature in the presence of iron powder or $NiCl_2$/Zn, and the product ester (IV) can be isolated by standard procedures.

This can be followed by acid hydrolysis to form acids of Formula (I) (M=H), and then optionally reacted with base to form salts of Formula (I) (M=Li, Na, K, $NH_4$).

When y=0, the compounds of Formula (I) can be prepared by oxidation of the substituted ethylene (II) (prepared as described above) with $KMnO_4$, followed by acidification to form the acid (M=H), and reaction with base to form the salts (M=Li, Na, K, $NH_4$). This is outlined in the reaction scheme shown below.

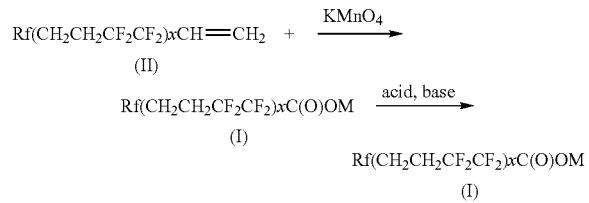

Also described herein is a process comprising the step of polymerizing at least one fluorinated monomer in an aqueous medium containing initiator and fluorosurfactant, said fluorosurfactant comprising a compound of Formula (I)

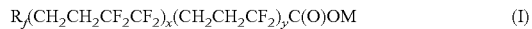

$$R_f(CH_2CH_2CF_2CF_2)_x(CH_2CH_2CF_2)_yC(O)OM \quad (I)$$

wherein $R_f$ is a linear or branched perfluoroalkyl group with 1 to 4 carbon atoms, x is 1 to 3, and y is 0 or 1; and M is H, $NH_4$, Li, Na, or K, with the proviso that the sum of x and y is 2 or greater.

Fluoropolymer dispersions formed by the polymerization process are comprised of particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer used in the process of this invention can be selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A typical perfluoroalkyl ethylene monomer is perfluorobutyl ethylene (PFBE). Typical fluorovinyl ethers include perfluoro(alkyl vinyl ether) monomers (PAVE) such as perfluoro (propyl vinyl ether) (PPVE), perfluoro(ethyl vinyl ether) (PEVE), and perfluoro(methyl vinyl ether) (PMVE). Non-fluorinated olefinic comonomers such as ethylene and propylene can optionally be copolymerized with the fluorinated monomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphorus-containing functional groups are disclosed in U.S. Pat. Nos. 5,637,748; 6,300,445; and 6,177,196.

The process is especially useful when producing dispersions of polytetrafluoroethylene (PTFE) including modified PTFE. PTFE and modified PTFE typically have a melt creep viscosity of at least about $1 \times 10^8$ Pa·s and, with such high melt viscosity, the polymer does not flow significantly in the molten state and therefore is not a melt-processible polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The modified PTFE contains a small amount of comonomer modifier which improves film forming capability during baking (fusing), such as perfluoroolefin, notably hexafluoropropylene (HFP) or perfluoro (alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomers that introduces bulky side groups into the molecule are also included.

The process is especially useful when producing dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with TFE or CTFE, notably ETFE, ECTFE and PCTFE.

A typical melt-processible copolymer for use in the practice of the present process comprises at least about 40-98 mol % tetrafluoroethylene units and about 2-60 mol % of at least one other monomer. Typical comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Typical PAVE monomers are those in which the alkyl group contains 1, 2, 3 or 4 carbon atoms, and the copolymer can be made using several PAVE monomers. Typical perfluoropolymers are TFE/HFP copolymer in which the HFP content is about 9-17 wt %, more preferably TFE/HFP/PAVE such as PEVE or PPVE, wherein the HFP content is about 9-17 wt % and the PAVE content, preferably PEVE, is about 0.2 to 3 wt %, to total 100 wt % for the copolymer.

Further useful polymers are film forming polymers of polyvinylidene fluoride (PVDF) and copolymers of vinylidene fluoride as well as polyvinyl fluoride (PVF) and copolymers of vinyl fluoride.

The process is also useful when producing dispersions of fluorocarbon elastomers. These elastomers typically have a glass transition temperature below 25° C. and exhibit little or no crystallinity at room temperature. By crystalline is meant that the polymers have some crystallinity and are characterized by a detectable melting point measured according to ASTM D 3418, and a melting endotherm of at least about 3 J/g. Melt-processible polymers that are not crystalline according to the preceding definition are amorphous.

Fluorocarbon elastomer copolymers made by the process typically contain 25 to 70 wt %, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from said first monomer, selected from the group consisting of fluorinated monomers, hydrocarbon olefins and mixtures thereof. Fluorocarbon elastomers prepared by the process may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Typical TFE based fluorocarbon elastomer copolymers include TFE/PMVE, TFE/PMVE/E, TFE/P and TFE/P/VF2. Preferred VF2 based fluorocarbon elastomer copolymers include VF2/HFP, VF2/HFP/TFE, and VF2/PMVE/TFE. Any of these elastomer copolymers may further comprise units of cure site monomer.

The process can be carried out as a batch process in a pressured reactor. Suitable vertical or horizontal reactors for carrying out the process are equipped with stirrers for the aqueous medium to provide sufficient contact of gas phase monomers such as TFE for desirable reaction rates and uniform incorporation of comonomers if employed. The reactor typically includes a cooling jacket surrounding the reactor so that the reaction temperature may be conveniently controlled by circulation of a controlled temperature heat exchange medium.

In a typical process, the reactor is first charged with deionized and deaerated water of the polymerization medium and fluorosurfactant is dispersed in the medium. The reactor can be optionally purged at least once with nitrogen and/or gaseous monomer to reduce oxygen content. For PTFE homopolymer and modified PTFE, paraffin wax as stabilizer is often added. A suitable procedure for PTFE homopolymer and modified PTFE includes first pressurizing the reactor with TFE. If used, the comonomer such as HFP or perfluoro (alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

Batch dispersion polymerizations can be described as proceeding in two phases. The initial period of the reaction can be said to be a nucleation phase during which a given number particles are established. Subsequently, it can be said that a growth phase occurs in which the predominant action is polymerization of monomer on established particles with little or no formation of new particles. The transition from the nucleation to the growth phase of polymerization occurs smoothly, typically between about the 4 and about the 10 percent solids in for the polymerization of TFE. The final raw dispersion particle size (RDPS) of the TFE polymer particles is typically in the range 50-350 nm. The amount of surfactant (I) of this invention used is effective to achieve the dispersion of polymer particles and preferably the preferred particle size within the range recited above.

After batch completion (typically several hours) when the desired amount of polymer or solids content has been achieved, the feeds are stopped, the reactor is vented and purged with nitrogen, and the raw dispersion in the vessel is transferred to a cooling vessel.

The solids content of the dispersion upon completion of polymerization can be varied depending upon the intended use for the dispersion. For example, the process described herein can be employed to produce a "seed" dispersion with low solids content, e.g., less than 10%, which is employed as "seed" for a subsequent polymerization process to a higher solids level. The process described herein can also be employed to produce fluoropolymer dispersion with a solids content of at least about 10 wt %, or more typically at least about 15%.

In one embodiment of the process, the polymerization produces less that about 10 wt %, and or less than 5 wt % undispersed fluoropolymer (coagulum) based on the total weight of fluoropolymer produced.

The as-polymerized dispersion can be stabilized with anionic, cationic, or nonionic surfactant for certain uses.

Typically however, the as-polymerized dispersion is transferred to a dispersion concentration operation which produces concentrated dispersions stabilized typically with non-ionic surfactants by known methods. Solids content of the concentrated dispersion is typically about 35 to about 70 wt %. Certain grades of PTFE dispersion are made for the production of fine powder. For this use, the dispersion is coagulated, the aqueous medium is removed and the PTFE is dried to produce fine powder.

The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate. The same dispersion concentration operation can be used to produce stabilized concentrated dispersions. Alternatively, for melt-processible fluoropolymers used as molding resin, the dispersion is coagulated and the aqueous medium is removed. The fluoropolymer is dried then processed into a convenient form such as flake, chip or pellet for use in subsequent melt-processing operations.

The process may also be carried out as a continuous process in a pressurized reactor. A continuous process is especially useful for the manufacture of fluorocarbon elastomers.

Polymerization as described herein employs free radical initiators capable of generating radicals under the conditions of polymerization. As is well known in the art, initiators for use in accordance with the invention are selected based on the type of fluoropolymer and the desired properties to be obtained, e.g., end group type, molecular weight, etc. For some fluoropolymers such as melt-processible TFE copolymers, water-soluble salts of inorganic peracids are employed which produce anionic end groups in the polymer. Preferred initiators of this type have a relatively long half-life, preferably persulfate salts, e.g., ammonium persulfate or potassium persulfate. To shorten the half-life of persulfate initiators, reducing agents such as ammonium bisulfite or sodium metabisulfite, with or without metal catalyst salts such as Fe, can be used. Preferred persulfate initiators are substantially free of metal ions and most preferably are ammonium salts.

For the production of PTFE or modified PTFE dispersions for dispersion end uses, small amounts of short chain dicarboxylic acids such as succinic acid or initiators that produce succinic acid such as disuccinic acid peroxide (DSP) are typically also added in addition to the relatively long half-life initiators such as persulfate salts. Such short chain dicarboxylic acids are typically beneficial in reducing undispersed polymer (coagulum). For the production of PTFE dispersion for the manufacture of fine powder, a redox initiator system such as potassium permanganate/oxalic acid is often used.

The initiator is added to the aqueous polymerization medium in an amount sufficient to initiate and maintain the polymerization reaction at a desired reaction rate. At least a portion of the initiator is typically added at the beginning of the polymerization. A variety of modes of addition may be used including continuously throughout the polymerization, or in doses or intervals at predetermined times during the polymerization. In one mode of operation the initiator is precharged to the reactor and additional initiator is continuously fed into the reactor as the polymerization proceeds. Typically, total amounts of ammonium persulfate and/or potassium persulfate employed during the course of polymerization are about 25 ppm to about 250 ppm based on the weight of the aqueous medium. Other types of initiators, for example, potassium permanganate/oxalic acid initiators, can be employed in amounts and in accordance with procedures as known in the art.

Chain-transfer agents may be used in a process in accordance with the polymerization of some types of polymers, e.g., for melt-processible TFE copolymers, to decrease molecular weight for the purposes of controlling melt viscosity. Chain transfer agents useful for this purpose are well-known for use in the polymerization of fluorinated monomers. Typical chain transfer agents include hydrogen, aliphatic hydrocarbons, halocarbons, hydrohalocarbons or alcohol having 1 to 20 carbon atoms, more preferably 1 to 8 carbon atoms. Representative examples of such chain transfer agents are alkanes such as ethane, chloroform, 1,4-diiodoperfluorobutane and methanol.

The amount of a chain transfer agent and the mode of addition depend on the activity of the particular chain transfer agent and on the desired molecular weight of the polymer product. A variety of modes of addition may be used including a single addition before the start of polymerization, continuously throughout the polymerization, or in doses or intervals at predetermined times during the polymerization. The amount of chain train transfer agent supplied to the polymerization reactor is typically about 0.005 to about 5 wt %, more typically from about 0.01 to about 2 wt % based upon the weight of the resulting fluoropolymer.

Test Methods

Comonomer content (PPVE) is measured by FTIR according to the method disclosed in U.S. Pat. No. 4,743,658, col. 5, lines 9-23.

Particle size, i.e., raw dispersion particle size (RDPS) is determined by laser diffraction techniques that measures the particle size distributions (PSD) of materials using a Microtrac Ultrafine Particle Analyzer (UPA). The UPA uses dynamic light scattering principle for measuring PSD with size range of 0.003 micron to 6.54 micron. The samples are analyzed after collecting the background with water. The measurements are repeated three times and averaged.

$^1$H NMR chemical shifts are reported as ppm downfield of tetramethylsilane reference. $^{19}$F NMR chemical shifts are reported as ppm downfield of CFCl$_3$ reference.

EXAMPLES

Example 1

TFE and Ethylene Oligomerization from Perfluoroethylethyl Iodide

After evacuation, a one gallon reactor was charged with perfluoroethyl iodide (PFEI) (3405 g) and VAZO 64 (1 g), a polymerization initiator, both available from E. I. du Pont de Nemours and Company, Wilmington, Del. Then reactor was pressurized with ethylene to 80 psig (51 g). The reactor was then heated to 65° C. and an exothermic reaction was observed. The internal temperature increased to 81° C. in several minutes while pressure dropped from 158 psig (peak) to 109 psig. More ethylene was added to maintain 150 psig pressure. A total of 415 g of ethylene was charged during 3 hour reaction. The reaction temperature was increased to 70° C. during the last hour reaction. A liquid product (3526 g) was obtained excluding the GC sampling (about 10 g). GC analysis of the reaction mixture indicated ethylene (1.4%), PFEI (0.7%), PFEEI (97.3%) and PFEBI (perfluoroethylbutyl iodide, 0.5%) based on GC area %.

A 400 mL shaker tube was charged with perfluoroethylethyl iodide (PFEEI) (45 g) and VAZO 64 (1 g). After cooling the vessel to an internal temperature of −15° C. and evacuating, ethylene (6 g) and tetrafluoroethylene (25 g) were added. The resulting mixture was heated to 80° C. for 20 hours. The unreacted perfluoroethylethyl iodide was recovered by vacuum distillation at room temperature. The remaining solid was extracted with $CH_3CN$ (3×100 mL). The $CH_3CN$ extracts were concentrated and distilled at reduced pressure to give pure iodide 1,1,2,2,5,5,6,6-octahydroperfluoro-1-iodooctane. The solid remaining after $CH_3CN$ extraction was extracted with warm tetrahydrofuran. The tetrahydrofuran extract was concentrated and dried to give pure 1,1,2,2,5,5,6,6,9,9,10,10-dodecahydroperfluoro-1-iodododecane. The solid remaining after tetrahydrofuran extraction was mainly iodides of formula $C_2F_5(CH_2CH_2CF_2CF_2)_nCH_2CH_2I$ wherein n=3 and higher oligomers as shown by GC and GC-MS. The products 1,1,2,2,5,5,6,6-octahydroperfluoro-1-iodooctane and 1,1,2,2,5,5,6,6,9,9,10,10-dodecahydroperfluoro-1-iodododecane were characterized as shown below:

1,1,2,2,5,5,6,6-octahydroperfluoro-1-iodooctane: mp 75-77° C.; $^1H$ NMR ($CDCl_3$): 2.33 (m, 4H), 2.68 (m, 2H), 3.24 (m, 2H); $^{19}F$ NMR ($CDCl_3$): −85.9 (s, 3F), −115.8 (m, 4F), −119.2 (m, 2F).

1,1,2,2,5,5,6,6,9,9,10,10-dodecahydroperfluoro-1-iodododecane: mp 125-128° C.; $^1H$ NMR (acetone-$d_6$): 2.46 (m, 8H), 2.77 (m, 2H), 3.37 (m, 2H); $^{19}F$ NMR (acetone-$d_6$): −86.7 (s, 3F), −117.1 (m, 6F), −117.3 (m, 2F), −119.5 (m, 2F).

Example 2

Preparation of 1,1,2,5,5,6,6-heptahydroperfluoro-1-octene

A mixture of 1,1,2,2,5,5,6,6-octahydro-1-iodoperfluorooctane (220 g) from Example 1 and MeOH (250 mL) was stirred at 60° C. NaOH (26 g) was added in portions at that temperature. After completion of the addition, the mixture was stirred at 60° C. for another 30 min. The resulting mixture was divided into two layers. The top layer was isolated and mixed with water (400 mL). The resulting bottom layer was isolated and combined with the original bottom layer, then washed with water (2×100 mL), dried over anhydrous $Na_2SO_4$, and distilled to give 113.9 g product 1,1,2,5,5,6,6-heptahydroperfluoro-1-octene, by 112° C., yield 77%. $^1H$ NMR ($CDCl_3$): 2.33 (m, 4H), 5.74 (m, 1H), 5.97 (m, 2H). $^{19}F$ NMR ($CDCl_3$): −86.0 (s, 3F), −115.4 (m, 2F), −116.3 (m, 2F), −119.3 (m, 2F).

Example 3

Preparation of 1,1,2,5,5,6,6,9,9,10,10-tridecahydroperfluoro-1-dodecene

A mixture of crude 1,1,2,2,5,5,6,6,9,9,10,10-dodecahydro-1-iodoperfluorododecane (58 g) from Example 1, potassium hydroxide (3.5 g) and MeOH (160 mL) was stirred at 65° C. Potassium hydroxide (4.5 g) was added in portions at that temperature. After completion of the addition of potassium hydroxide, the mixture was stirred at 65° C. for another 30 min. EtOH (35 mL) and KOH (2 g) were added to the mixture. The resulting mixture was stirred at 65° C. for another 6 hours. Most of the solid dissolved. The solution was poured into water (600 mL) and the precipitated solid was collected by filtration. The remaining solid in the reaction flask was mixed with MeOH (40 mL) and ethanol (40 mL) and heated to 65° C. for another hour. This mixture was poured into water (400 mL), and the precipitated solid was collected by filtration. Two portions of the solid were combined and washed with water (3×300 mL) and dried in vacuo (2 torr) to remove water. The solid was further purified by short path distillation with an air condenser at reduced pressure to give the product, 39.7 g by 128-9° C./75 torr, mp 69-70° C. $^1H$ NMR ($CDCl_3$): 2.33 (8, 4H), 5.73 (d, J=11 Hz, 1H), 5.96 (m, 2H). $^{19}F$ NMR ($CDCl_3$): −86.0 (s, 3F), −115.4 (m, 2F), −115.9 (m, 4F), −116.5 (m, 2F), −119.3 (t, J=17 Hz, 2F).

Example 4

Preparation of methyl 3,3,4,4,7,7,8,8-octahydroperfluorodecanoate

A mixture of 1,1,2,5,5,6,6-heptahydroperfluoro-1-octene (131 g) from Example 2, ethyl bromodifluoroacetate (Syn-Quest Laboratories, Inc., Alachua, Fla.) (141 g), Fe powder (41 g), MeOH (480 mL) was refluxed for 3 days. The reaction mixture was decanted to remove the solids. The liquid was concentrated to give a solid, which is dissolved in ether (2 L) and washed with HCl (1 N, 2×300 mL), water (300 mL), dried over $Na_2SO_4$, and then concentrated to give a white solid product (155 g). The solid was recrystallized from MeOH (300 mL) to give product A, (72 g). The mother liquid was cooled in a refrigerator. More product was obtained, as product B, 28 g, combined yield 54%, mp 65-67° C. $^1H$ NMR ($CDCl_3$): 3.92 (s, 3H), 2.34 (m, 8H). $^{19}F$ NMR ($CDCl_3$): −85.9 (s, 3F), −107.2 (t, J=16 Hz, 2F), −115.5 (m, 2F), −115.7 (m, 2F), −119.2 (t, J=16 Hz, 2F).

Example 5

Preparation of 3,3,4,4,7,7,8,8-octahydroperfluorodecanoic acid

A mixture of 3,3,4,4,7,7,8,8-octahydroperfluorodecanoate from Example 4 (52.5 g), and NaOH (10%, 400 mL) was stirred at 70° C. for 1 hour. After being cooled to room temperature, the solid was collected by filtration and washed with water (3×100 mL), and dried in vacuo to give the salt. The salt was then mixed with HCl (10%, 350 mL) and heated to 70° C. for 1 hour. The mixture was cooled and the solid was collected by filtration, and washed with HCl (10%, 100 mL), $CH_2Cl_2$ (2×50 mL), and acetone (300 mL). The acetone wash was concentrated and dried in vacuo to give 3,3,4,4,7,7,8,8-octahydroperfluorodecanoic acid, 48 g, mp 128-131° C., 95% yield. $^1H$ NMR (acetone-$d_6$): 3.27 (br s, 1H), 2.45 (m, 8H). $^{19}F$ NMR (acetone-$d_6$), −86.7 (s, 3F), −107.9 (t, J=16 Hz, 2F), −117.0 (m, 4F), −119.5 (m, 2F).

Example 6

Preparation of ammonium 3,3,4,4,7,7,8,8-octahydroperfluorodecanoate 3,3,4,4,7,7,8,8-Octahydroperfluorodecanoic acid from Example 5 (25 g) was mixed with ether (150 mL). Insoluble solid (about 1.3 g) was removed by filtration. Ammonia solution (28% $NH_3$ in water, 4.9 g) was added to the filtrate dropwise at room temperature. The resulting mixture was stirred at room temperature for two hours. The product was collected by filtration and washed with ether (2×50 mL), dried in vacuo to give ammonium 3,3,4,4,7,7,8,8-octahydroperfluorodecanoate, 24.5 g, yield, 99%, mp 200-213° C. $^1H$ NMR ($D_2O$): 2.49 (m, 4H), 2.31 (m, 4H). $^{19}F$ NMR ($D_2O$): −85.8 (s, 3F), −105.5 (t, J=15 Hz, 2F), −116.2 (t, J=17 Hz, 2F), −116.4 (t, J=17 Hz, 2F), −118.9 (t, J=18 Hz, 2F. Elemental analysis calc: C, 31.01%; H, 3.12%; F, 53.97%. Observed: C, 31.01%; H, 3.04%; F, 53.98%.

Example 7

Preparation of 4,4,5,5,8,8,9,9-octahydroperfluoroundecanoic acid

A 500 mL flask was charged with water (50 mL), 1,1,2,5, 5,6,6,9,9,10,10-tridecahydroperfluoro-1-dodecene from Example 3 (4 g), and $KMnO_4$ (3 g). The resulting mixture was slowly heated to 65° C. After it has stirred at 65° C. for 30 min, the olefin (10 g), and $KMnO_4$ (4 g) were added in small portions alternately over 1 hour. The mixture was then stirred at 65° C. for another hour. After cooling to room temperature, concentrated HCl (30 mL) was very slowly added to the reaction mixture while cooling with an ice-water bath. The resulting mixture was then stirred at room temperature overnight. The solid was collected by filtration and washed with HCl (2N, 50 mL), water (3×30 mL), and dried in vacuo to give 4,4,5,5,8,8,9,9-octahydroperfluoroundecanoic acid (11 g). $^1$H NMR (acetone-$d_6$): 2.51 (m, 8H), 5.71 (br s, 1H). $^{19}$F NMR (acetone-$d_6$): −86.7 (s, 3F), −117.1 (m, 6F), −119.5 (t, J=17 Hz, 2F), 121.4 (m, 2F).

Example 8

Preparation of methyl 4,4,5,5,8,8,9,9-octahydroperfluoroundecanoate

A mixture of 4,4,5,5,8,8,9,9-octahydroperfluoroundecanoic acid from Example 7 (10 g), MeOH (60 mL) and conc. $H_2SO_4$ (0.5 mL) was refluxed for 5 hours. Water (300 mL) was added and the resulting solid was collected by filtration and washed with water (3×50 mL), and dried in vacuo to give methyl 4,4,5,5,8,8,9,9-octahydroperfluoroundecanoate, 9.0 g, 87% yield, Mp 56-58° C. GC-MS (m/e) 395 (0.6%), 375 (0.8%), 325 (0.4%), 197 (7.3%), 177 (11%), 59 (100%). $^1$H NMR ($CDCl_3$): 3.97 (s, 3H), 2.35 (m, 8H). $^{19}$F NMR ($CDCl_3$): −85.9 (s, 3F), −117.5 (m, 6F), −119.2 (t, J=17 Hz, 2F), −120.1 (s, 2F) ppm.

Example 9

Preparation and Purification of 4,4,5,5,8,8,9,9-octahydroperfluoroundecanoic acid from methyl 4,4,5,5,8,8,9,9-octahydroperfluoroundecanoate A mixture of methyl 4,4,5,5,8,8,9,9-octahydroperfluoroundecanoate (3.6 g) and NaOH solution (10%, 25 mL) was stirred at 70° C. for 1 hour. The solid was collected by filtration and washed with water (2×20 mL), and dried to give a white solid product, 3.6 g.

The solid product was mixed with HCl (10%, 60 mL) and heated to 70° C. for 2 hours. The resulting solid was washed with HCl (10%, 2×20 mL), water (3×10 mL), and $CH_2Cl_2$ (20 mL), and dried to give 4,4,5,5,8,8,9,9-octahydroperfluoroundecanoic acid, 3.4 g, 97% yield, mp 144-146° C. $^1$H NMR (acetone-$d_6$): 2.52 (m). $^{19}$F NMR (acetone-$d_6$): −86.7 (s, 3F), −116.9 (t, J=18 Hz, 2F), −117.1 (m, 4F), −119.3 (t, J=18 Hz, 2F), −121.7 (s, 2F).

Example 10

Preparation of ammonium 4,4,5,5,8,8,9,9-octahydroperfluoroundecanoate

Ammonia solution (28% $NH_3$ in water, 0.8 g) was added to a mixture of acid 4,4,5,5,8,8,9,9-octahydroperfluoroundecanoic acid from Example 9 (3.3 g) and ether (25 mL) at room temperature. The reaction mixture was stirred at room temperature for 15 hours. The solid was collected by filtration and washed with ether (2×20 mL), and dried to give ammonium 4,4,5,5,8,8,9,9-octahydroperfluoroundecanoate, 3.15 g, 92% yield. $^1$H NMR ($D_2O$): 2.47 (m). $^{19}$F NMR ($D_2O$): −85.7 (s, 3F), −115.9 (t, J=18 Hz, 2F), −116.4 (m, 4F), −118.7 (t, J=18 Hz, 2F), −119.4 (s, 2F).

Comparative Example 11

Deaerated water was used in the polymerizations. It was prepared by pumping deionized water into a large stainless steel vessel and vigorously bubbling nitrogen gas for approximately 30 minutes through the water to remove all oxygen.

Surfactant solution 1 consists of 19 wt. % APFO (ammonium perfluorooctanoate, E. I. DuPont de Nemours, Inc., Wilmington, Del.) in deionized water, and initiator solution 1 consists of 1.0 g ammonium persulfate (purchased from Sigma-Aldrich Corporation, St. Louis, Mo., USA) in 1000 g deionized water.

The reactor was a 1 Liter vertical autoclave made of Inconel®, equipped with a three-bladed ribbon agitator and a baffle insert. No chain transfer agent was used in these Examples. A vacuum of approximately −13 PSIG (11.7 kPa) was applied to the reactor. This was used to draw in a solution of 4.8 g Surfactant Solution 1 and 500 mL deaerated water as a precharge. The reactor was then purged three times (agitator=100 RPM) by pressurization with nitrogen gas to 50 PSIG (450 kPa) followed by venting to 1 PSIG (108 kPa) to reduce oxygen content. It was further purged three times (agitator=100 rpm) by pressurization with gaseous tetrafluoroethylene (TFE) to 25 PSIG (274 kPa) followed by venting to 1 PSIG (108 kPa) further insuring that the contents of the autoclave were free of oxygen. The agitator rate was increased to 600 RPM, the reactor was heated to 65° C., and then perfluoro (propyl vinyl ether) (PPVE) (12.8 g) was pumped as a liquid into the reactor.

When at temperature, the reactor pressure was raised to a nominal 250 PSIG (1.83 MPa) by adding TFE (~38 g). Initiator Solution 1 was fed to the reactor at a rate of 20 mL/min for 1 min. to provide a precharge of 0.02 g ammonium persulfate. It was then pumped at a rate of 0.25 mL/min. until the end of the batch which was defined as the point at which 90 g of TFE has been consumed, measured as mass loss in a TFE weigh tank.

At kickoff (defined as the point at which a 10 PSIG (70 kPa) pressure drop was observed) the polymerization was deemed to have been started, which was also the start point for feeding PPVE at a rate of 0.12 g/min. for the rest of the polymerization. Reactor pressure was kept constant at 250 PSIG (1.83 MPa) by feeding TFE as needed throughout the entire polymerization.

After 90 g of TFE has been consumed, the agitator was slowed to 200 RPM, all feeds to the reactor were shut off, and the contents were cooled to 30° C. over the course of 30 minutes. The agitator was then turned down to 100 RPM and the reactor was vented to atmospheric pressure.

The fluoropolymer dispersion was filtered through cheesecloth to remove any undispersed polymer (coagulum) produced by the polymerization. The filtered coagulum was placed in a small aluminum pan and dried in a vacuum oven for a minimum of 8 hours at 100° C. to remove excess water. The dried coagulum is reported in Table 1 as wt. % of the total isolated polymer solids.

The fluoropolymer dispersion thus produced has a solids content of typically around 15-16 wt. %.

Polymer was isolated from the filtered dispersion by freezing, thawing and filtration. The polymer was washed with deionized water and filtered several times before being dried overnight in a vacuum oven at 80° C. and a vacuum of 30 mm Hg (4 kPa). Results are reported in Table 1 as wt % solids of polymer in the filtered dispersion.

The results of two duplicate runs using APFO surfactant are reported in Table 1 as 11a and 11b.

Example 12

Following the general procedure of Comparative Example 11, the reactor precharge was a surfactant solution as described below with no additional water. The surfactant solution was employed having a formula $CF_3CF_2CH_2CH_2CF_2CF_2CH_2CH_2CF_2COO~NH_4$ (Ammonium 3,3,4,4,7,7,8,8-octahydroperfluorodecanoate from Example 6) which was prepared by adding deionized water to ammonium 3,3,4,4,7,7,8,8-octahydroperfluorodecanoate (0.865 g) to give a final solution mass of 500.0 g. The results of two duplicate runs are reported in Table 1 as 12a and 12b.

Example 13

Following the general procedure of Comparative Example 11, the reactor precharge was 500 g of surfactant solution as described below with no additional water. The surfactant solution was employed having a formula $CF_3CF_2CH_2CH_2CF_2CF_2CH_2CH_2CF_2CF_2COO~NH_4$ (Ammonium 4,4,5,5,8,8,9,9-octahydroperfluoroundecanoate from Example 10) which was prepared by adding deionized water to ammonium 4,4,5,5,8,8,9,9-octahydroperfluoroundecanoate (0.92 g) to give a final solution mass of 500.0 g. The results of three duplicate runs are reported in Table 1 as 13a, 13b, and 13c.

It can be seen that the compounds described herein when used as surfactants give performance in polymerizations that is comparable to the widely used surfactant AFPO, but with use less fluorine.

What is claimed is:

1. A process comprising the step of polymerizing at least one fluorinated monomer in an aqueous medium containing initiator and fluorosurfactant, said fluorosurfactant comprising a compound of Formula (I)

$$R_f(CH_2CH_2CF_2CF_2)_x(CH_2CH_2CF_2)_yC(O)OM \qquad (I)$$

wherein $R_f$ is a linear or branched perfluoroalkyl group with 1 to 4 carbon atoms, x is 1 to 3, and y is 0 or 1; and M is H, $NH_4$, Li, Na, or K; with the proviso that the sum of x and y is 2 or greater.

2. The process of claim 1 wherein $R_f$ is a linear perfluoroalkyl group with 1 to 4 carbon atoms, and M is H, $NH_4$, Li, Na or K.

3. The process of claim 1 wherein x is 1 and y is 1.

4. The process of claim 1 wherein x is 2 and y is 0.

5. The process of claim 1 wherein $R_f$ is $CF_3CF_2$—, x is 1, y is 1, and M is $NH_4$.

6. The process of claim 1 wherein $R_f$ is $CF_3CF_2$—, x is 2, y is 0, and M is $NH_4$.

7. The process of claim 1 wherein said fluorinated monomer is selected from the group consisting of tetrafluoroethylene, hexafluoropropylene, chlorotrifluoroethylene, trifluoroethylene, hexafluoroisobutylene, perfluoroalkyl ethylenes, fluorovinyl ethers, vinyl fluoride, vinylidene fluoride, perfluoro-2,2-dimethyl-1,3-dioxole, perfluoro-2-methylene-4-methyl-1,3-dioxolane, perfluoro(allyl vinyl ether) and perfluoro(butenyl vinyl ether).

8. The process of claim 1 wherein said fluorinated monomer is tetrafluoroethylene.

9. The process of claim 1 wherein said fluorinated monomer is tetrafluoroethylene and at least one additional monomer.

10. The process of claim 1 wherein said fluorinated monomer are tetrafluoroethylene and perfluoro(propyl vinyl ether).

TABLE 1

Copolymerization of TFE and PPVE

| Example | Surfactant | Surfactant Amount (g) | Surfactant Amount (mmol) | Kickoff Time (min) | Run Time (min) |
|---|---|---|---|---|---|
| Comp. 11a | APFO | 0.96 | 2.23 | 11 | 80 |
| Comp. 11b | APFO | 0.96 | 2.23 | 12 | 84 |
| 12a | $CF_3CF_2CH_2CH_2CF_2CF_2CH_2CH_2CF_2COONH_4$ | 0.86 | 2.11 | 19 | 119 |
| 12b | $CF_3CF_2CH_2CH_2CF_2CF_2CH_2CH_2CF_2COONH_4$ | 0.86 | 2.11 | 13 | 109 |
| 13a | $CF_3CF_2CH_2CH_2CF_2CF_2CH_2CH_2CF_2CF_2COONH_4$ | 0.92 | 2.11 | 22 | 106 |
| 13b | $CF_3CF_2CH_2CH_2CF_2CF_2CH_2CH_2CF_2CF_2COONH_4$ | 0.92 | 2.11 | 23 | 106 |
| 13c | $CF_3CF_2CH_2CH_2CF_2CF_2CH_2CH_2CF_2CF_2COONH_4$ | 0.92 | 2.11 | 20 | 108 |

| Example | RDPS (nm) | Solids in dispersion (wt. %) | Dried Coag. (wt. %) | PPVE (wt. %) | Wt % F | Grams F per run |
|---|---|---|---|---|---|---|
| Comp. 11a | 138 | 15.7 | 2.4 | 4.6 | 66.1% | 0.63 |
| Comp. 11b | 136 | 16.3 | 1.0 | 3.2 | 66.1% | 0.63 |
| 12a | 170 | 15.8 | 2.0 | 5.6 | 54.0% | 0.46 |
| 12b | 168 | 15.6 | 4.6 | 5.4 | 54.0% | 0.46 |
| 13a | 150 | 16.3 | 1.0 | 5.7 | 56.5% | 0.52 |
| 13b | 148 | 16.4 | 1.1 | 5.0 | 56.5% | 0.52 |
| 13c | 145 | 16.0 | 2.6 | 5.6 | 56.5% | 0.52 |

11. The process of claim 1 wherein said polymerizing produces an aqueous dispersion of particles of fluoropolymer having a fluoropolymer solids content of at least about 10 wt %.

12. The process of claim 1 wherein said polymerizing produces at least about 15 wt % undispersed fluoropolymer based on the total weight of fluoropolymer produced.

13. The process of claim 1 wherein said polymerizing produces less than about 5 wt % undispersed fluoropolymer based on the total weight of fluoropolymer produced.

* * * * *